F. E. STEVENSON & R. BROWN.
PULVERIZER.
APPLICATION FILED MAR. 17, 1914.

1,123,613.

Patented Jan. 5, 1915.

WITNESSES:
F. C. Fliedner
G. M. Ball

INVENTORS,
Fredric E. Stevenson
Robert Brown
BY Francis M. Wright,
ATTORNEY

UNITED STATES PATENT OFFICE.

FREDRIC E. STEVENSON AND ROBERT BROWN, OF HEALDSBURG, CALIFORNIA.

PULVERIZER.

1,123,613.  Specification of Letters Patent.  Patented Jan. 5, 1915.

Application filed March 17, 1914. Serial No. 825,231.

*To all whom it may concern:*

Be it known that we, FREDRIC E. STEVENSON and ROBERT BROWN, citizens of the United States, residing at Healdsburg, in the county of Sonoma and State of California, have invented new and useful Improvements in Pulverizers, of which the following is a specification.

The object of the present invention is to provide an improved pulverizer, which will be of simple and inexpensive construction, will very effectively pulverize the soil and which can be attached to any other implement for preparing the soil, as, for instance, to a clod crusher, and which can be adjusted to enable it to be attached to an implement of any size.

The implement is adapted to be used in place of a harrow, and has teeth or prongs so devised as to pierce or disintegrate the clods or lumps without bringing them to the surface, which would cause them to dry out, and also without disturbing or bringing to the surface a cover crop, weeds or any other growth that may have been plowed under, as will other toothed or plate pulverizers, thereby permitting the soil to be enriched by the rotting of vegetation which other toothed or plate pulverizers bring to the surface.

The invention is also intended to act as a cultivator, disturbing the soil without bringing the moist earth to the surface, the latter result being most necessary to avoid in dry climates.

A further object of the invention is to provide a pulverizer which will effectively pulverize the hard clods upon which harrows, seed drills and other clod-crushing or pulverizing implements will make no impression, and without packing the ground as is done by clod-crushing rollers.

Figure 1:
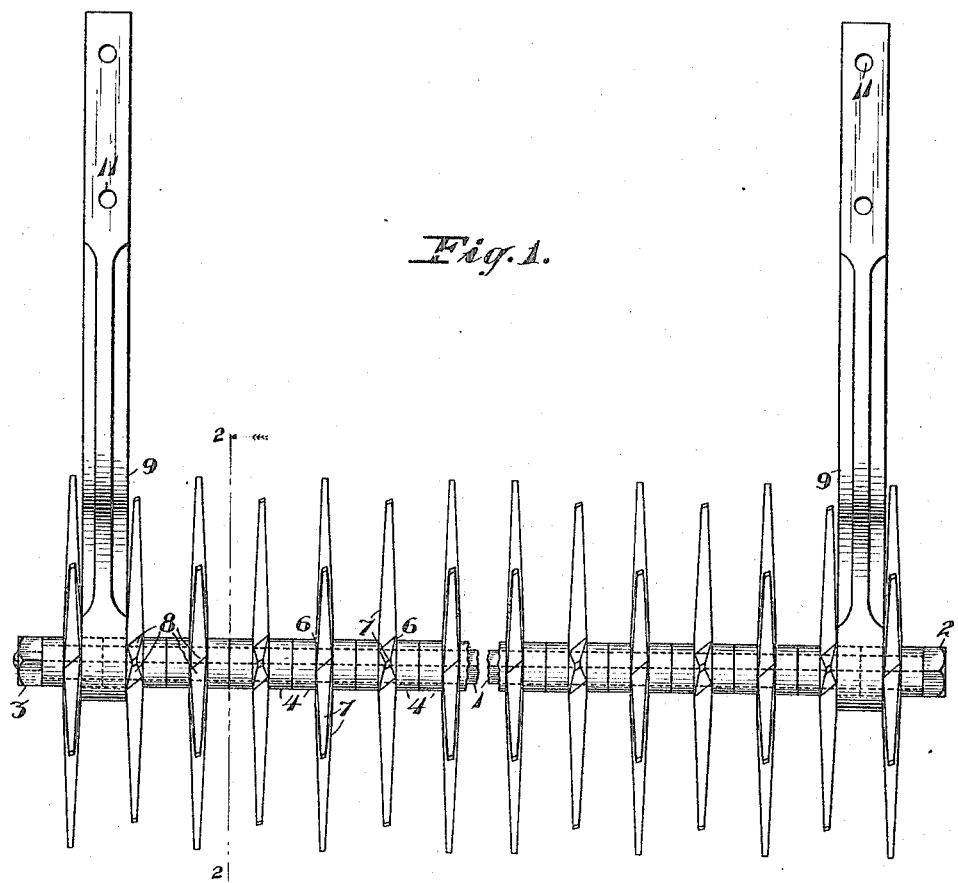
Figure 2:
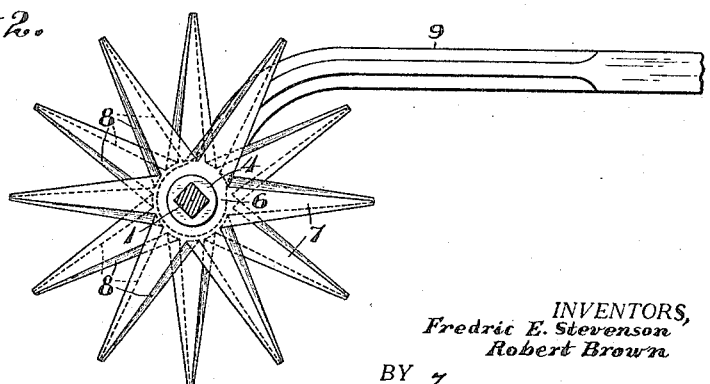

In the accompanying drawing, Figure 1 is a broken plan view of our improved pulverizer; Fig. 2 is a vertical longitudinal section thereof on the line 2—2 of Fig. 1.

Referring to the drawing, 1 indicates a square shaft having a head 2 at one end and threaded at the other end to receive a nut 3. Said shaft extends through square holes in a plurality of hubs 4, the nut 3 being screwed upon the shaft 1 to tighten the hubs against each other. Extending centrally from said hubs and cast integral therewith are star-shaped plates 6, having a plurality, here shown as six, of prongs 7, said prongs diminishing in thickness, as well as in width, to their points. The edges of each prong are beveled on opposite sides, as shown at 8, at an angle of about 45°. Surrounding two pairs of adjacent ends of adjoining hubs are apertured rear ends of draft bars 9, the front ends of which are apertured, as shown at 11, to permit them to be secured to any desired agricultural implement. It is evident that these draft bars can be placed at any desired distance apart from one another so as to permit them to be attached to an instrument of any width, and that any number of plates 6 can be on the shaft 1 outside the draft bars.

Our improved pulverizer is extremely simple and inexpensive in construction, as the plates are all duplicates of one another, and the square rod, the nut and the draft bars are the only other parts.

The implement forms a very effective pulverizer, since it cannot become clogged up, for, on account of the bevel at both the front and rear edges of each prong being in the same direction, no clod can remain between the prongs, but it is forced in an oblique direction therethrough.

We claim:—

A pulverizer comprising a shaft, a plurality of plates side by side thereon, each plate having prongs extending outward therefrom wholly in a plane at right angles to said shaft, said prongs having edges formed by single bevels, the bevel forming one edge being on the opposite side of the prong from that forming the other edge, and draft bars in which said shaft is supported.

In testimony whereof we have hereunto set our hands in the presence of two subscribing witnesses.

FREDRIC E. STEVENSON.
ROBERT BROWN.

Witnesses:
FRANCIS M. WRIGHT,
D. B. RICHARDS.

Copies of this patent may be obtained for five cents each, by addressing the "Commissioner of Patents, Washington, D. C."